(12) United States Patent
Abe et al.

(10) Patent No.: US 7,845,680 B2
(45) Date of Patent: Dec. 7, 2010

(54) AIRBAG AND AIRBAG APPARATUS

(75) Inventors: Kazuhiro Abe, Tokyo (JP); Masayoshi Kumagai, Tokyo (JP)

(73) Assignee: Takata Corporation, Tokyo (JP)

( * ) Notice: Subject to any disclaimer, the term of this patent is extended or adjusted under 35 U.S.C. 154(b) by 141 days.

(21) Appl. No.: 12/227,057

(22) PCT Filed: Apr. 24, 2007

(86) PCT No.: PCT/JP2007/058819

§ 371 (c)(1),
(2), (4) Date: Nov. 6, 2008

(87) PCT Pub. No.: WO2007/145027

PCT Pub. Date: Dec. 21, 2007

(65) Prior Publication Data

US 2009/0236836 A1   Sep. 24, 2009

(30) Foreign Application Priority Data

Jun. 14, 2006   (JP) .............................. 2006-164981

(51) Int. Cl.
*B60R 21/231*   (2006.01)
*B60R 21/239*   (2006.01)
(52) U.S. Cl. .................................... 280/739; 280/743.1
(58) Field of Classification Search ................ 280/739, 280/742, 743.1, 743.2
See application file for complete search history.

(56) References Cited

U.S. PATENT DOCUMENTS

| 5,280,954 | A | 1/1994 | Henseler et al. | |
|---|---|---|---|---|
| 5,833,265 | A | 11/1998 | Seymour | |
| 5,871,231 | A | 2/1999 | Richards et al. | |
| 6,352,283 | B1 | 3/2002 | Ellerbrok et al. | |
| 7,401,811 | B2 | 7/2008 | Nagai et al. | |
| 7,481,456 | B2 * | 1/2009 | Nozaki et al. | 280/743.1 |
| 7,497,467 | B2 * | 3/2009 | Chida et al. | 280/739 |
| 7,581,755 | B2 * | 9/2009 | Nagai et al. | 280/743.1 |
| 2005/0098991 | A1 * | 5/2005 | Nagai et al. | 280/743.1 |

(Continued)

FOREIGN PATENT DOCUMENTS

DE            200 03 500 U1    6/2000

(Continued)

*Primary Examiner*—Paul N Dickson
*Assistant Examiner*—Joseph Rocca
(74) *Attorney, Agent, or Firm*—Manabu Kanesaka

(57) ABSTRACT

An airbag capable of starting a tearing operation of a line-shaped connecting portion on an outer periphery side after entire line-shaped connecting portion on an inner periphery side is torn, and an airbag apparatus provided with the airbag. Each of halfway portions disposed halfway between respective center portion and peripheral edge portion in a front panel 12 and a rear panel 14 is disconnectably connected by means of line-shaped connecting portions 22, 24, and 26. At a halfway portion in an extending direction of each of the line-shaped connecting portions 22, 24, and 26, communicating portions 23, 25, and 27 serving as starting points of the tearing operations therefor are formed. Each of the communicating portions 23 and 25 of the respective line-shaped connecting portions 22 and 24 provided next to each other in a radial direction, and each of the communicating portions 25 and 27 of the respective line-shaped connecting portions 24 and 26 are positioned on opposite sides while sandwiching a center of an airbag 10, respectively.

8 Claims, 15 Drawing Sheets

U.S. PATENT DOCUMENTS

2009/0206587 A1* 8/2009 Abe .................. 280/743.1

FOREIGN PATENT DOCUMENTS

| | | |
|---|---|---|
| DE | 198 37 897 B4 | 9/2005 |
| EP | 1 514 743 B1 | 11/2007 |
| JP | H04-166454 A | 6/1992 |
| JP | H07-125586 A | 5/1995 |
| JP | H07-125587 A | 5/1995 |
| JP | H07-125589 A | 5/1995 |
| JP | H08-32511 A | 2/1996 |
| JP | H08-32511 | 3/1996 |
| JP | H08-119052 A | 5/1996 |
| JP | H08-156730 A | 6/1996 |
| JP | H08-301037 A | 11/1996 |
| JP | H09-48317 A | 2/1997 |
| JP | H 09-263202 A | 10/1997 |
| JP | H09-315246 | 12/1997 |
| JP | H10-6899 A | 1/1998 |
| JP | H11-20588 A | 1/1999 |
| JP | 2004-314738 A | 11/2004 |
| JP | 2005-014862 A | 1/2005 |
| JP | 2005-1195058 A | 5/2005 |
| JP | 2005-193881 A | 7/2005 |
| JP | 2005-199987 A | 7/2005 |

\* cited by examiner

AIRBAG AND AIRBAG APPARATUS

TECHNICAL FIELD

The present invention relates to an airbag in which a front panel on an occupant side of the airbag and a rear panel on the opposite side thereto are disconnectably connected by means of a plurality of circular line-shaped connecting portions that are approximately concentrically extended in a peripheral direction of the airbag at halfway portions disposed halfway between respective center portion and peripheral edge portion thereof, and more specifically it relates to an airbag in which a communicating portion allowing an inner periphery side and an outer periphery side relative to the line-shaped connecting portion to communicate with each other, while partially interrupting a connection of the front panel and the rear panel is provided at a halfway portion in an extending direction of each of the line-shaped connecting portion. Further, the present invention relates to an airbag apparatus provided with the airbag.

BACKGROUND ART

It is well-known that a front panel on an occupant side of an airbag and a rear panel on the opposite side thereto are disconnectably connected by means of a plurality of circular line-shaped connecting portions that are approximately concentrically extended in a peripheral direction of the airbag at halfway portions disposed halfway between respective center portion and peripheral edge portion thereof (for example, Japanese Unexamined Patent Application Publication No. 8-156730, etc). This connection-releasable line-shaped connecting portion is constructed to release a connection of the front panel and the rear panel by tearing when internal pressure of the airbag is brought to a predetermined pressure or more.

In a case that a gas is supplied into the thus constructed airbag from a gas-generator and the airbag is expanded, since the connection of the front panel and the rear panel by the line-shaped connecting portion is not released until the internal pressure of the airbag is brought to the predetermined pressure or more, the expanding operation of a portion on the outer periphery side relative to the line-shaped connecting portion in the airbag is limited. Accordingly, the pressure in the airbag is rapidly raised by means of the gas from the gas-generator.

When the internal pressure of the airbag is brought to the predetermined pressure or more, each of the line-shaped connecting portions is torn and the connection of the front panel and the rear panel is released. As a result, the airbag is brought to a state to be able to expand up to an outermost peripheral portion thereof. At this moment, the internal pressure of the airbag is maintained to be high pressure during the time from an initial stage of the expanding operation of the airbag to a completion of the expanding operation thereof by means of tearing the line-shaped connecting portion from the line-shaped connecting portion on the innermost periphery side to the line-shaped connecting portion on the outermost periphery side in a sequential manner (stepwise manner).

In order to start a tearing operation of the line-shaped connecting portion from a predetermined position, it is described in FIG. 2 of the aforementioned Japanese Unexamined Patent Application Publication No. 8-156730 that a communicating portion (appellation is not shown in the Japanese Unexamined Patent Application Publication No. 8-156730) that allows an inner periphery side and an outer periphery side relative to a line-shaped connecting portion to communicate with each other, while a connection of the front panel and the rear panel is partially interrupted, is provided at a halfway portion in an extending direction of the line-shaped connecting portion (called as a stitching portion in the Japanese Unexamined Patent Application Publication No. 8-156730). In the thus constructed case, when the internal pressure of the airbag is brought to a predetermined pressure or more, a stress is concentrated to an end portion of the line-shaped connecting portion facing the communicating portion, and the tearing operation of the line-shaped connecting portion is started from the end portion.

[Patent Document 1] Japanese Unexamined Patent Application Publication No. 8-156730

In FIG. 2 of the aforementioned Japanese Unexamined Patent Application Publication No. 8-156730, any of the communicating portion of the line-shaped connecting portion on the innermost periphery side, the communicating portion of the line-shaped connecting portion on the outermost periphery side, and the communicating portion of the line-shaped connecting portion in between these are disposed in a positional relationship of overlapping with each other in a peripheral direction of the airbag (equal phase relationship).

As described above, when the communicating portion of the line-shaped connecting portion on the inner periphery side and the communicating portion of the line-shaped connecting portion on the outer periphery side are disposed at a position overlapping with each other in the peripheral direction of the airbag, or a position relatively close to each other, the internal pressure of the airbag is brought to be instantly applied to the communicating portion of the line-shaped connecting portion on the outer periphery side after the tearing operation of the line-shaped connecting portion on the inner periphery side is started. Therefore, there is a possibility that the line-shaped connecting portion on the outer periphery side also starts tearing operation before finishing the tearing operation of the entire line-shaped connecting portion on the inner periphery side.

In this case, the tearing operation may locally proceed up to the line-shaped connecting portion on the outermost periphery side in the peripheral direction of the airbag, or a portion in the line-shaped connecting portion, which is spaced apart from the communicating portion, may partially remain without being torn. Thereby, the airbag becomes difficult to be evenly expanded in the peripheral direction thereof.

Further, in FIG. 2 of the aforementioned Japanese Unexamined Patent Application Publication No. 8-156730, since a venthole is provided in the vicinity of the communicating portion of the line-shaped connecting portion on the outermost periphery side, there is a possibility that the gas in the airbag is discharged outside the airbag from the venthole, while passing through the communicating portion in a short-cut manner before finishing the tearing operation up to the line-shaped connecting portion on the outermost periphery side. In this case, there is also a possibility that an elevation of the internal pressure of the airbag and the tearing operation of the line-shaped connecting portion along with that are delayed.

SUMMARY OF THE INVENTION

It is an object of the present invention to provide an airbag capable of starting a tearing operation of a line-shaped connecting portion on an outer periphery side after an entire line-shaped connecting portion on an inner periphery side is torn, and an airbag apparatus provided with the airbag.

Further, in an aspect of the present invention, it is an object to provide an airbag capable of discharging a gas in the airbag outside the airbag from a venthole after an entire line-shaped connecting portion on an outermost periphery side is torn, and an airbag apparatus provided with the airbag.

The airbag according to the present invention is characterized in that an airbag includes a front panel disposed on an occupant side, and a rear panel disposed on a side opposite to the occupant, in which in the front panel and the rear panel, peripheral edge portions thereof are connected to each other, and an opening for use in a gas-generator is provided at a center of the rear panel, and each of halfway portions disposed halfway between respective center portions and peripheral edge portions of the front panel and the rear panel is disconnectably connected by means of a circular line-shaped connecting portion extending in a peripheral direction of the airbag in the front panel and the rear panel, and the line-shaped connecting portion is approximately concentrically provided in a plurality, and a communicating portion allowing an inner periphery side and an outer periphery side relative to the line-shaped connecting portion to communicate with each other while partially interrupting a connection of the front panel and the rear panel is provided at a halfway portion in an extending direction of each of the line-shaped connecting portions, in which the individual communicating portions are positioned on a side opposite to each other while a center of the airbag is sandwiched between each of the line-shaped connecting portions provided next to each other in a radial direction.

An airbag apparatus according to the present invention is provided with an airbag according to the thus described present invention and a gas-generator for expanding the airbag.

DETAILED EXPLANATION

Figure 1:
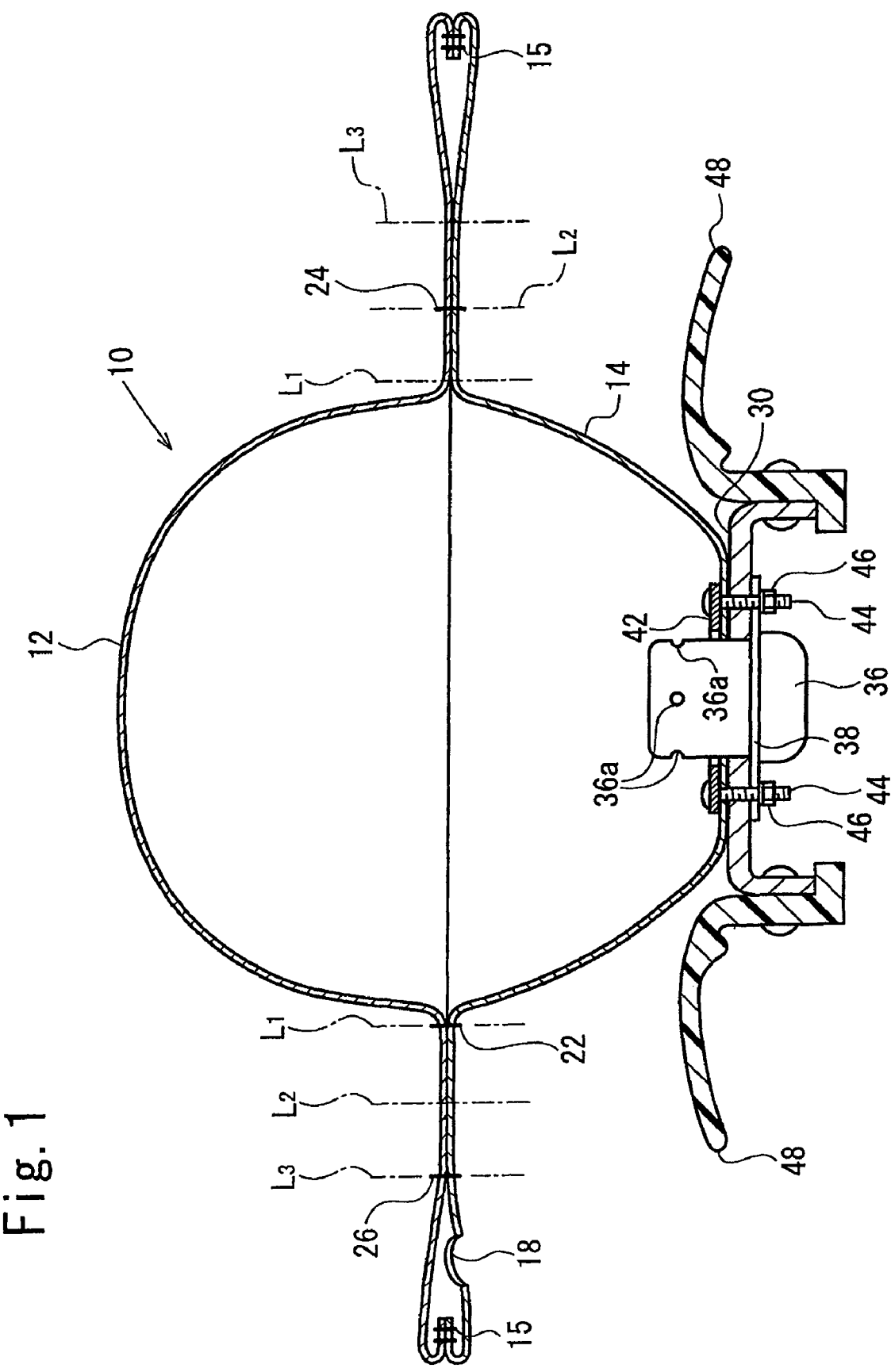
FIG. 1 is a cross-sectional view of an airbag and an airbag apparatus, illustrating a proceeding process of an expanding operation of the airbag according to an embodiment.

An airbag in a first aspect is an airbag including a front panel disposed on an occupant side, and a rear panel disposed on an opposite side to the occupant, in which in the front panel and the rear panel, each of peripheral edge portions thereof is connected, and an opening for use in a gas-generator is provided at a center of the rear panel, and is characterized in that in the front panel and the rear panel, each of halfway portions disposed halfway between respective center portions and peripheral edge portions of the front panel and the rear panel is disconnectably connected by means of a circular line-shaped connecting portion extending in a peripheral direction of the airbag, and the line-shaped connecting portion is approximately concentrically provided in a plurality, and a communicating portion allowing an inner periphery side and an outer periphery side relative to the line-shaped connecting portion to communicate with each other while partially interrupting a connection of the front panel and the rear panel is provided at a halfway portion in an extending direction of each of the line-shaped connecting portions, in which the individual communicating portions are positioned on a side opposite to each other while a center of the airbag is sandwiched between each of the line-shaped connecting portions provided next to each other in a radial direction.

The airbag in a second aspect is characterized in that in the first aspect, both end sides of the line-shaped connecting portions facing the communicating portion are extended toward a center side of the airbag.

The airbag in a third aspect is characterized in that in the first and second aspect, a venthole is provided in an area to be the outer periphery side relative to the line-shaped connecting portion of an outermost periphery side in the rear panel, and the communicating portion of the line-shaped connecting portion of the outermost periphery side and the venthole are positioned on the sides opposite to each other while sandwiching the center of the airbag.

The airbag in a fourth aspect is characterized in that in any one of the first through third aspect, the venthole is provided in the rear panel, and a lid member for covering the venthole is provided inside the airbag, and one end side of the lid member is connected to the front panel and the rear panel by means of the line-shaped connecting portion on at least an outermost periphery side, and the other end side is connected to the rear panel by means of a connecting device that is different from the line-shaped connecting portion, and the communicating portion of the line-shaped connecting portion on the outermost periphery side is positioned on an opposite side to the one end side of the lid member while sandwiching the center of the airbag.

An airbag apparatus in a fifth aspect is characterized in that in an airbag apparatus including an airbag and a gas-generator for expanding the airbag, the airbag is the airbag in any one of the first through fourth aspect.

In the airbag and the airbag apparatus according to the present invention, a communicating portion allowing the inner periphery side and the outer periphery side relative to the line-shaped connecting portion to communicate with each other while interrupting the connection of the front panel and the rear panel is formed in a halfway portion in an extending direction of each of the line-shaped connecting portions, and when pressure in the airbag is brought to a predetermined pressure or more, each of the line-shaped connecting portions starts tearing operation from both end sides facing the communicating portion. This tearing operation of the line-shaped connecting portion proceeds from both end sides toward the vicinity of an intermediate portion in an extending direction of the line-shaped connecting portion, namely toward a portion positioned on the opposite side to the communicating portion while sandwiching the center of the airbag.

In the present invention, at a portion between each of the line-shaped connecting portions provided next to each other in the radial direction, respective communicating portions are positioned on the opposite side to each other while sandwiching the center of the airbag. In other words, the communicating portion of the line-shaped connecting portion on the outer periphery side in each of the line-shaped connecting portions provided next to each other in the radial direction, namely a starting position of the tearing operation of the line-shaped connecting portion on the outer periphery side is positioned in the vicinity of a finishing point of the tearing operation of the line-shaped connecting portion on the inner periphery side. Accordingly, until the tearing operation of an entire line-shaped connecting portion on the inner periphery side is finished, internal pressure of the airbag is difficult to be applied to the communicating portion of the line-shaped connecting portion on the outer periphery side, and thereby the tearing operation of the line-shaped connecting portion on the outer periphery side is started after the entire line-shaped connecting portion on the inner periphery side is torn.

As described in the second aspect, by means of extending both end sides of the line-shaped connecting portions facing the communicating portion toward a center side of the airbag, a stress by the internal pressure of the airbag becomes easy to concentrate on both end sides of the line-shaped connecting portion, and it becomes possible to assuredly start the tearing operation of the line-shaped connecting portion from both end sides thereof.

In the third aspect, since the venthole is disposed on the outer periphery side relative to the line-shaped connecting portion on the outermost periphery side, and in the vicinity of the finishing point of the tearing operation of the line-shaped connecting portion in the rear panel, the venthole is difficult to be brought to an open state until the tearing operation of the entire line-shaped connecting portion on the outermost periphery side is finished. Accordingly, the gas can be prevented from being needlessly discharged outside the airbag from the venthole before the tearing operation of each of the line-shaped connecting portions is finished.

In the fourth aspect, a lid member for covering the venthole from inside the airbag is provided. In this lid member, one end side thereof is connected to the front panel and the rear panel by means of the line-shaped connecting portion on the at least outermost periphery side, and the other end side thereof is connected to the rear panel by means of the connecting device different from the line-shaped connecting portion. The one end side of the lid member is positioned on the opposite side to the communicating portion of the line-shaped connecting portion on the outermost periphery side while sandwiching the center of the airbag, namely is positioned in the vicinity of the finishing point of the tearing operation of the line-shaped connecting portion on the outermost periphery side.

Accordingly, the connection of the one end side of the lid member and the front panel and the rear panel by means of the line-shaped connecting portion is not released until the tearing operation of the line-shaped connecting portion on the outermost periphery side is finished, and the venthole remains closed by means the lid member. Thereby, it is possible to prevent the gas from being discharged outside the airbag from the venthole before the tearing operation for all the line-shaped connecting portion is finished.

Incidentally, in the fourth aspect, when the entire line-shaped connecting portion on the outermost periphery side is torn, the connection of the one end side of the lid member and the front panel and the rear panel is released, and the one end side of the lid member is brought to a free end. Accordingly, the lid member is pushed outside the airbag from the venthole by means of the internal pressure of the airbag, and as a result, the venthole is brought to the open state.

Hereinbelow, an embodiment of the present invention will be explained with reference to the drawings.

Figure 3:
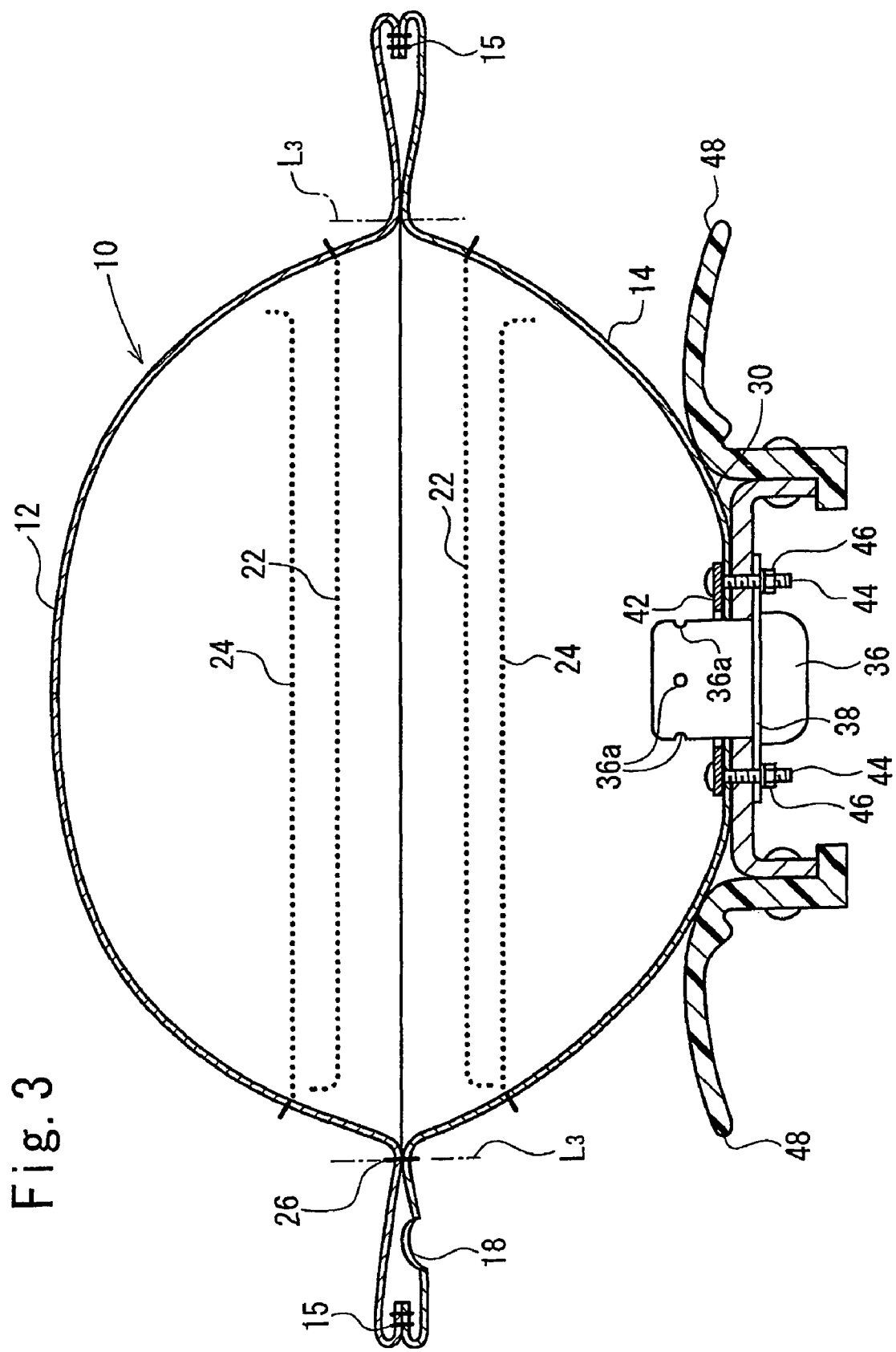
FIG. 3 is a cross-sectional view of the airbag and the airbag apparatus, illustrating the proceeding process of the expanding operation of the airbag of FIG. 1.
Figure 4:
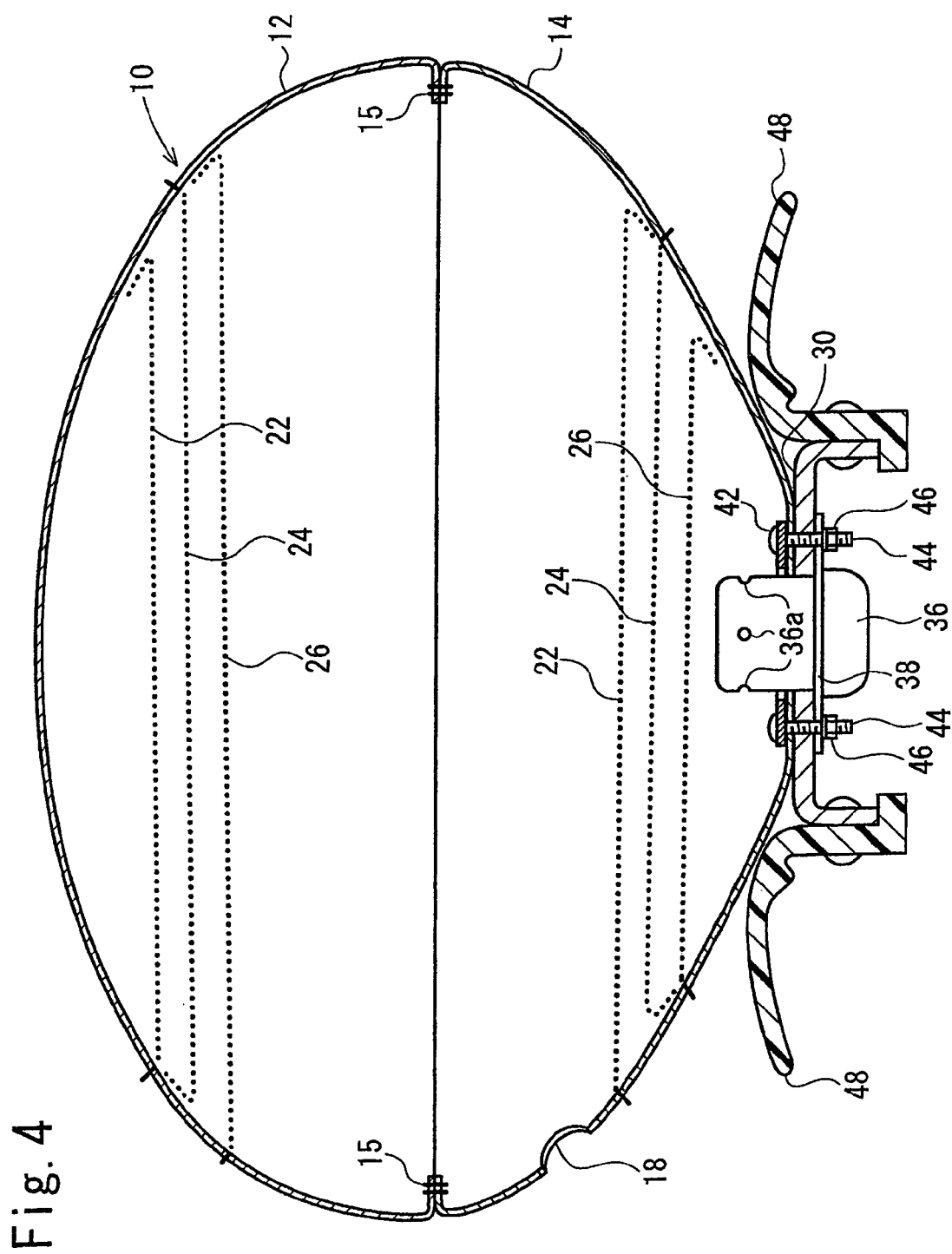
FIG. 4 is a cross-sectional view of the airbag and the airbag apparatus, illustrating the proceeding process of the expanding operation of the airbag of FIG. 1.
Figure 5:
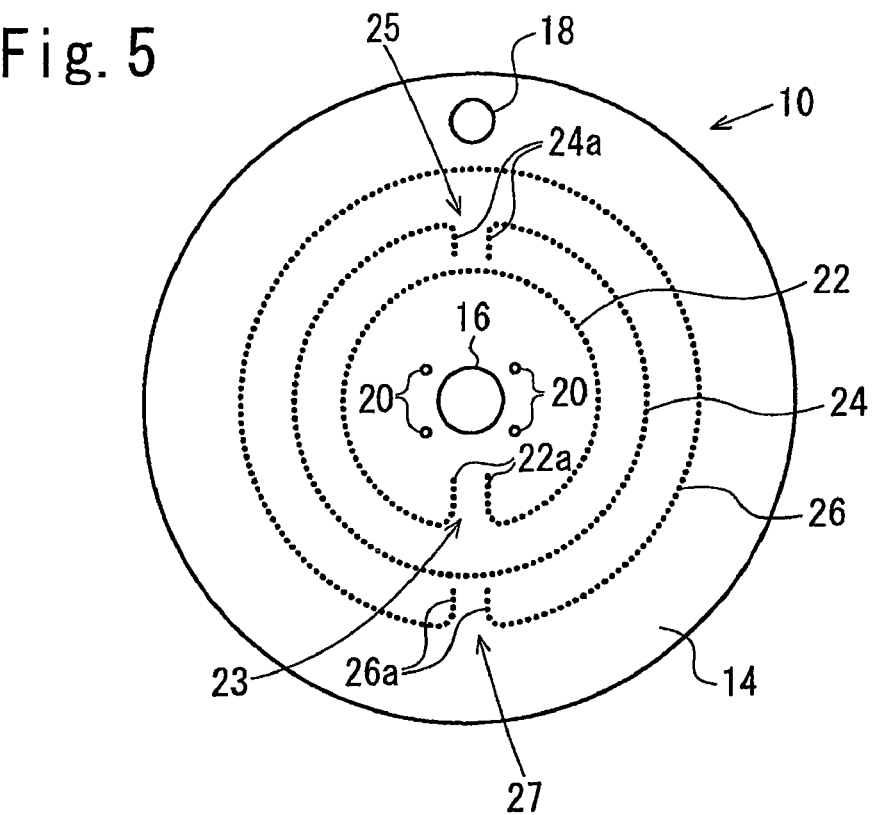
FIG. 5 is a plan view illustrating a state before a tearing operation of a line-shaped connecting portion of the airbag of FIG. 1 is started.

FIGS. 1 through 4 are cross-sections views of an airbag and an airbag apparatus, illustrating a proceeding process of an expanding operation of the airbag according to the embodiment. FIG. 5 is a plan view illustrating a state before a tearing operation of a line-shaped connecting portion of the airbag is started. FIGS. 6 through 11 are plan views illustrating a proceeding process of the tearing operation of the line-shaped connecting portion. FIGS. 5 through 11 are views illustrating the airbag looking from a rear panel side.

Figure 2:
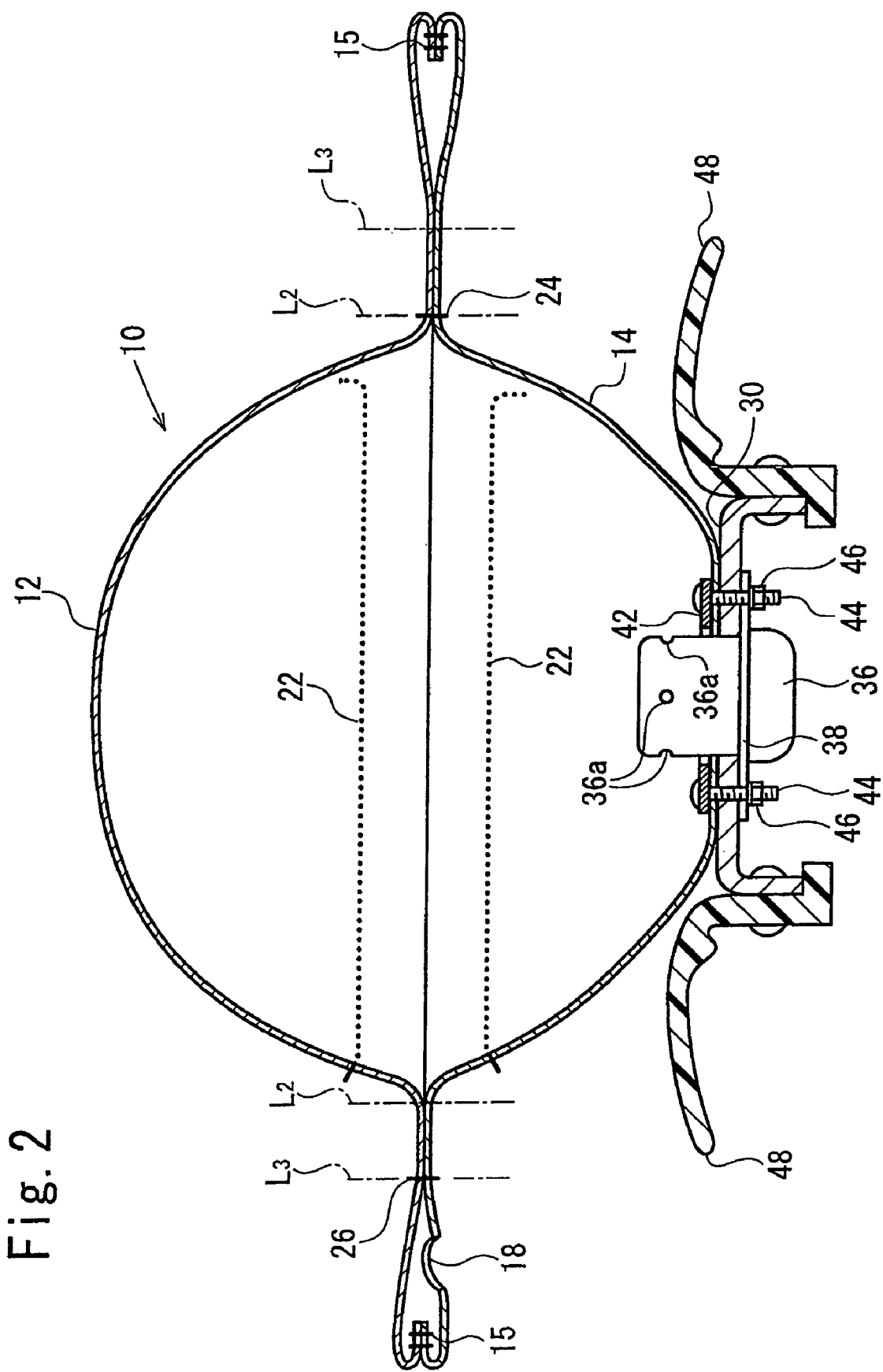
FIG. 2 is a cross-sectional view of the airbag and the airbag apparatus, illustrating the proceeding process of the expanding operation of the airbag of FIG. 1.
Figure 6:
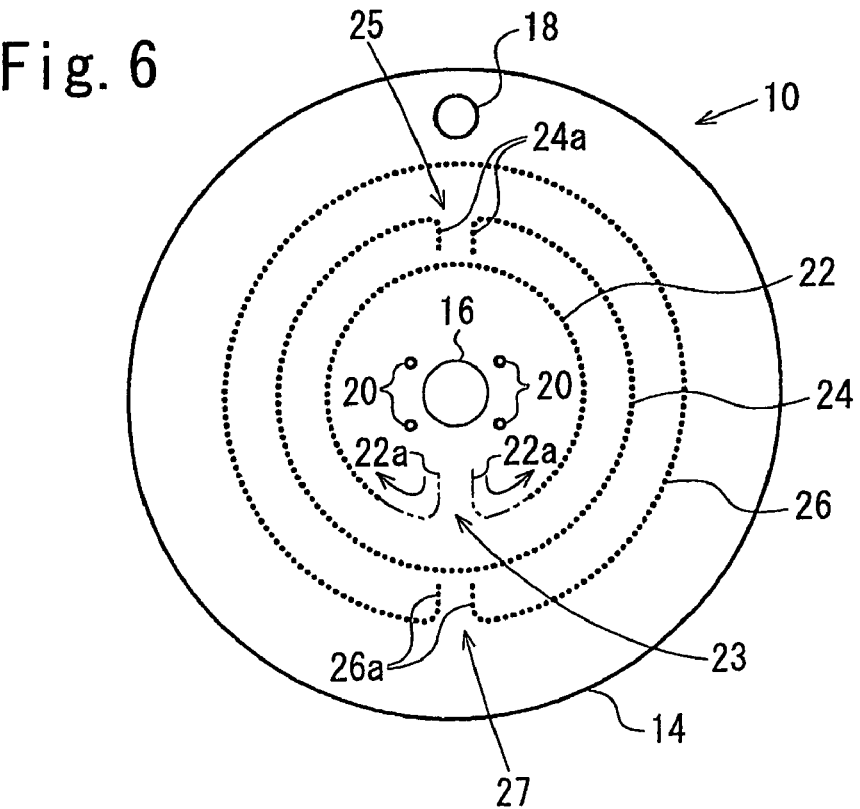
FIG. 6 is a plan view illustrating a proceeding process of the tearing operation of the line-shaped connecting portion of the airbag of FIG. 1.
Figure 7:
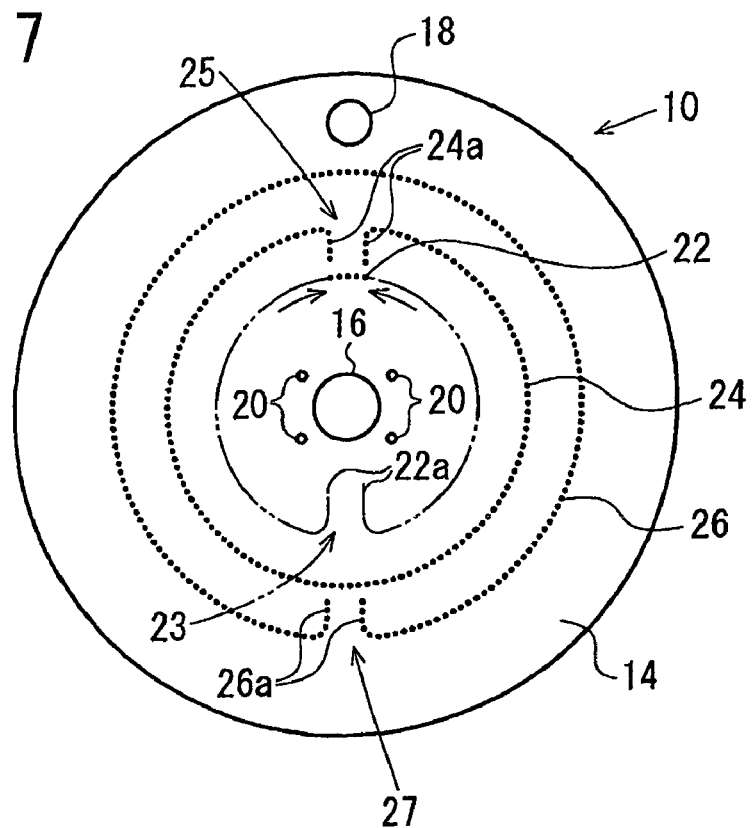
FIG. 7 is a plan view illustrating the proceeding process of the tearing operation of the line-shaped connecting portion of the airbag of FIG. 1.
Figure 8:
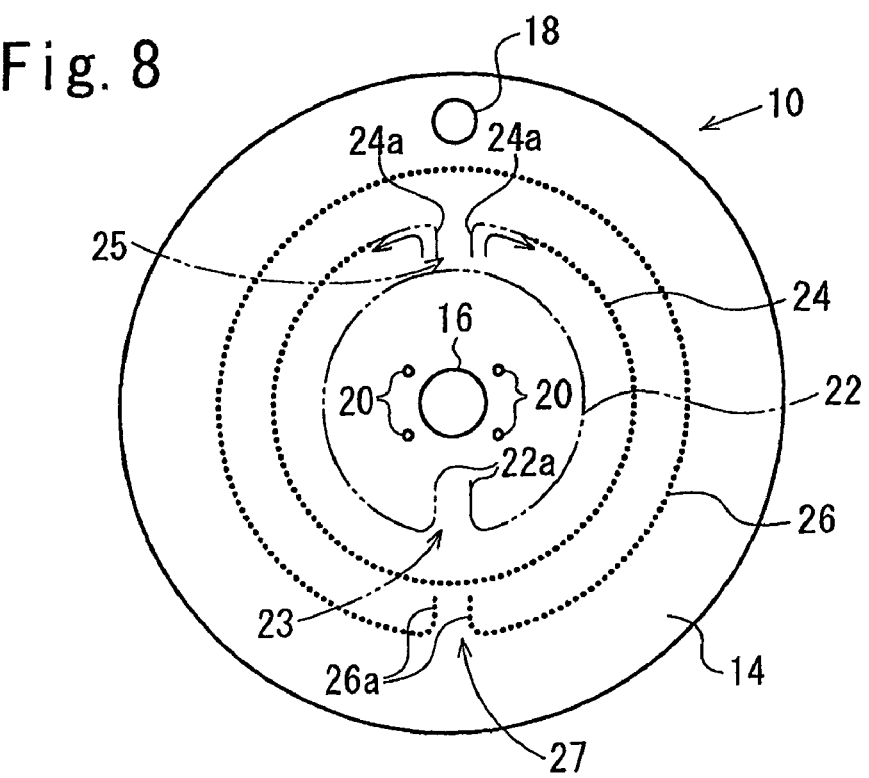
FIG. 8 is a plan view illustrating the proceeding process of the tearing operation of the line-shaped connecting portion of the airbag of FIG. 1.
Figure 9:
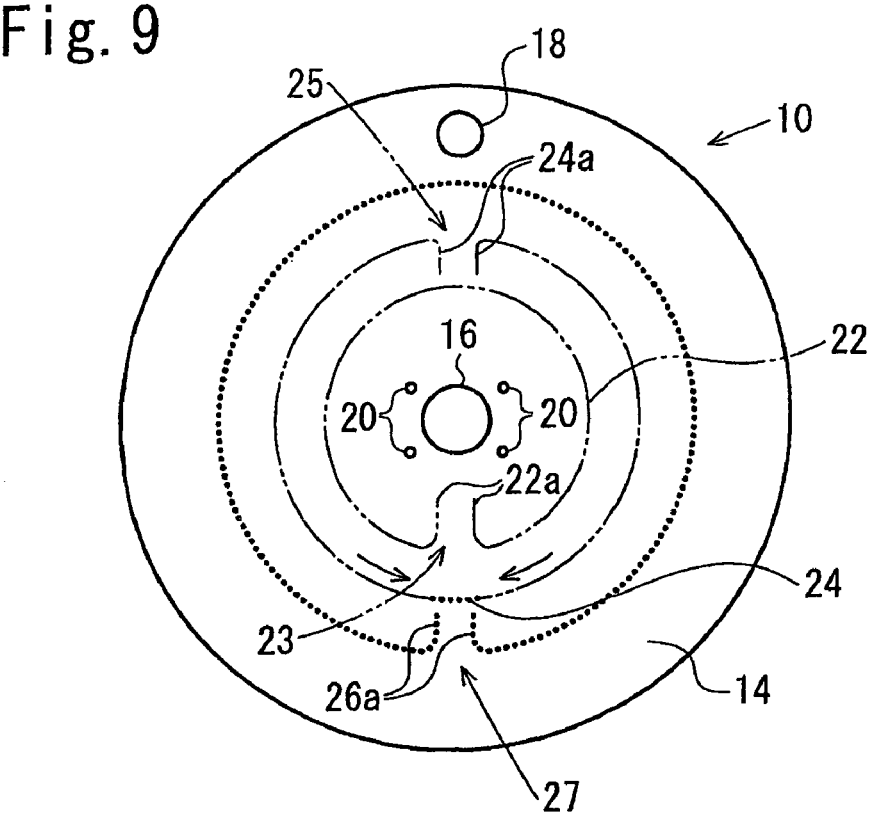
FIG. 9 is a plan view illustrating the proceeding process of the tearing operation of the line-shaped connecting portion of the airbag of FIG. 1.
Figure 10:
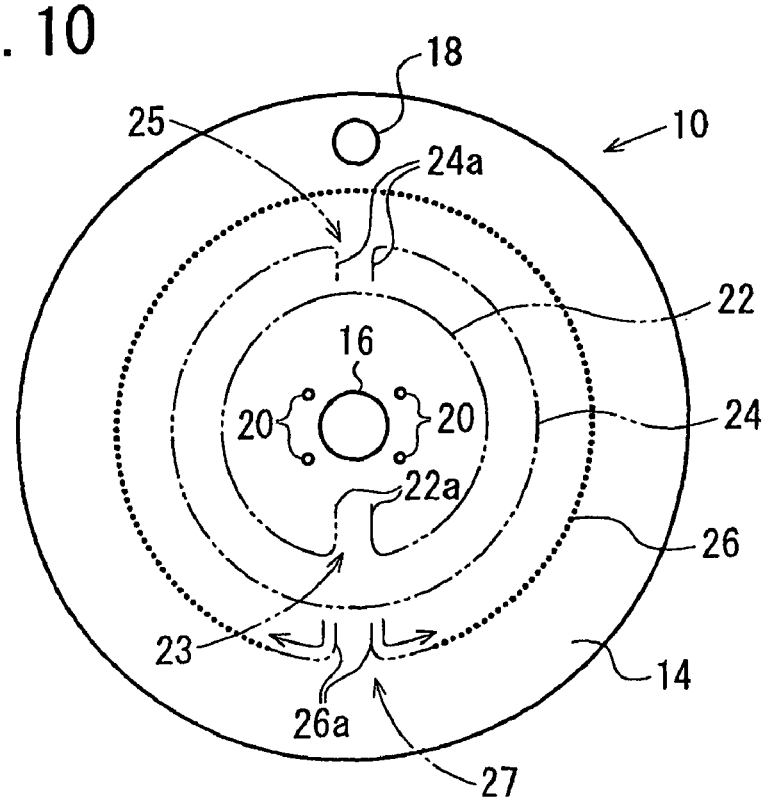
FIG. 10 is a plan view illustrating the proceeding process of the tearing operation of the line-shaped connecting portion of the airbag of FIG. 1.
Figure 11:
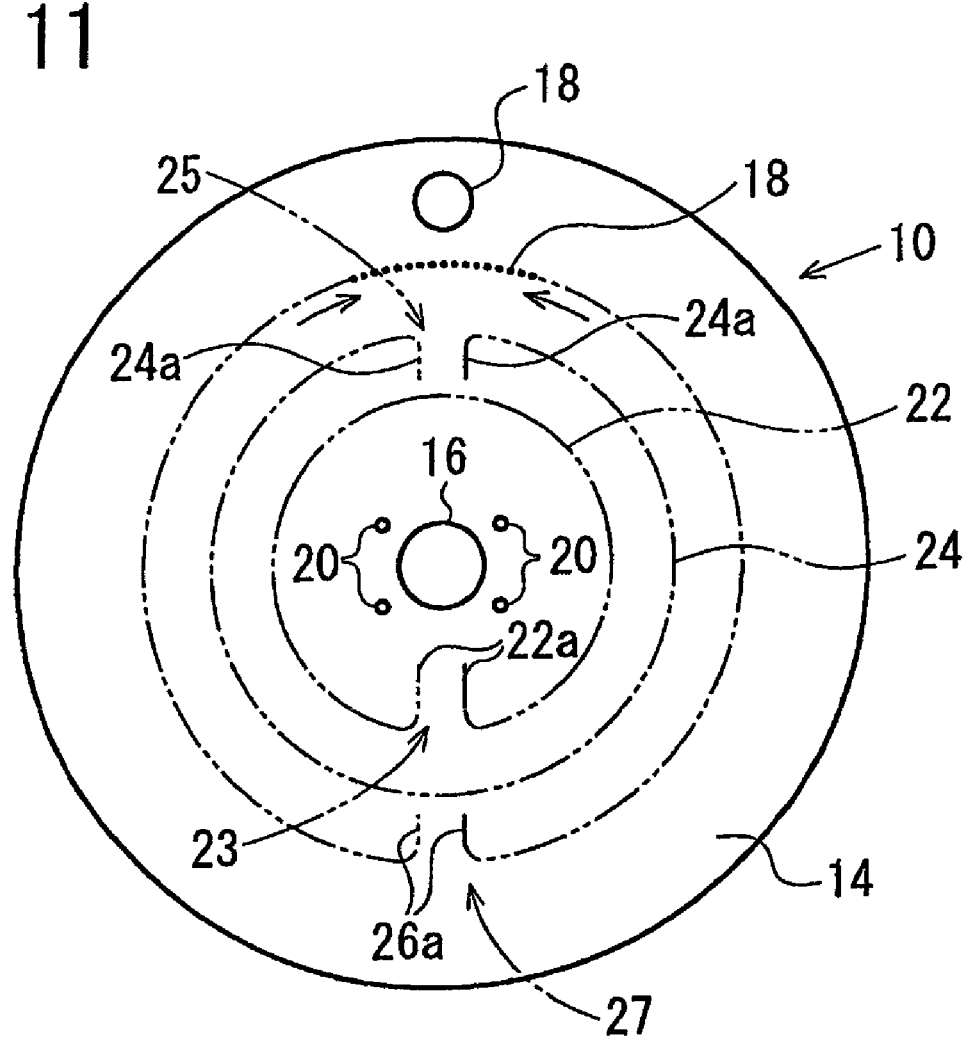
FIG. 11 is a plan view illustrating the proceeding process of the tearing operation of the line-shaped connecting portion of the airbag of FIG. 1.

Incidentally, FIG. 1 illustrates a state before the line-shaped connecting portion of a first round is torn. FIG. 2 illustrates a state before the line-shaped connecting portion of a second round is torn. FIG. 3 illustrates a state before the line-shaped connecting portion of a third round is torn. FIG. 4 illustrates a state after the line-shaped connecting portion of the third round is torn. Further, FIG. 6 illustrates a state just after the tearing operation of the line-shaped connecting portion of the first round is started. FIG. 7 illustrates a state just before the tearing operation of the line-shaped connecting portion of the first round is finished. FIG. 8 illustrates a state just after the tearing operation of the line-shaped connecting portion of the second round is started. FIG. 9 illustrates a state just before the tearing operation of the line-shaped connecting portion of the second round is finished. FIG. 10 illustrates a state just after the tearing operation of the line-shaped connecting portion of the third round is started. FIG. 11 illustrates a state just before the tearing operation of the line-shaped connecting portion of the third round is finished.

An airbag 10 of this embodiment is an airbag for use in a driver's seat of an automobile.

This airbag 10 is formed to have a bag shape by means of stitching each of outer peripheral edge portions of a front panel 12 and a rear panel 14 respectively formed of a round woven cloth with a seam 15 formed of a thread or the like. This seam 15 is a high strength seam that is not torn even when internal pressure of the airbag 10 is brought to a predetermined pressure or more.

In the rear panel 14, an opening 16 for use in an inflator (gas-generator) and a venthole 18 are provided. This opening 16 for use in an inflator is disposed at a center of the rear panel 14. Bolt insertion holes 20 are provided around the opening 16 for use in an inflator. In this embodiment, the venthole 18 is provided relatively close to a peripheral edge portion (seam 15) of the rear panel 14.

An area on an outer periphery side relative to the opening 16 for use in an inflator and the bolt insertion holes 20 and on an inner periphery side relative to the venthole 18 in the rear panel 14, and an area facing the same in the front panel 12 are disconnectably connected by means of circular line-shaped connecting portions 22, 24, and 26 that are extended in a peripheral direction of the airbag 10 in a manner surrounding a periphery of the opening 16 for use in an inflator.

Each of the line-shaped connecting portions 22, 24, and 26 is constructed to release the connection of the front panel 12 and the rear panel 14 by being torn when the internal pressure of the airbag 10 is brought to the predetermined pressure or more. Although each of the line-shaped connecting portions 22, 24, and 26 can be constructed of, for example, a stitching thread (tear seam) or the like that is cut when predetermined tension force is applied, the material thereof is not limited thereto.

These line-shaped connecting portions 22, 24, and 26 are extended in an approximately concentric manner as illustrated in FIG. 5. Hereinbelow, a position of each of the line-shaped connecting portions 22, 24, and 26 may sometimes be described as the first round (line-shaped connecting portion 22), the second round (line-shaped connecting portion 24), and the third round (line-shaped connecting portion 26) from the innermost periphery side.

Incidentally, in the present invention, it is preferable that the line-shaped connecting portion 22 of the first round (innermost periphery side) is disposed between radiuses of 400 and 600 mm, specifically between 450 and 550 mm from a center of the airbag 10. A distance between each of the line-shaped connecting portions 22 and 24, and a distance between each of the line-shaped connecting portions 24 and 26 provided next to each other in the radial direction is preferable to be from 10 to 50 mm, specifically from 20 to 40 mm, respectively.

In this embodiment, although a total of three rounds of the line-shaped connecting portions 22, 24, and 26 are provided, only two rounds, or four or more rounds thereof may be provided.

In a halfway portion in an extending direction of each of the line-shaped connecting portions 22, 24, and 26, communicating portions 23, 25, or 27 allowing the inner periphery side and the outer periphery side relative to the line-shaped connecting portions 22, 24, or 26 to communicate with each other while partially interrupting the connection of the front panel 12 and the rear panel 14 is respectively formed.

As illustrated in FIG. 5, between each of the line-shaped connecting portions 22 and 24, and between each of the line-shaped connecting portions 24 and 26 provided next to each other in the radial direction, each of the respective communicating portions 23 and 25, and each of the respective communicating portions 25 and 27 are respectively positioned on the side opposite to each other sandwiching the center of the airbag 10. Incidentally, in this embodiment, the communicating portion of the line-shaped connecting portion 22 of the first round is disposed just below the center of the airbag 10, the communicating portion of the line-shaped connecting portion 24 of the second round is disposed just above the center of the airbag 10, and the communicating portion of the line-shaped connecting portion 26 of the third round is disposed just below the center of the airbag 10.

The aforementioned venthole 18 is positioned on an outer periphery side of the airbag 10 relative to the line-shaped connecting portion 26 on the outermost periphery side, and further is positioned on the side opposite to the communicating portion 27 of the line-shaped connecting portion 26 sandwiching the center of the airbag 10, namely in this embodiment, is positioned just above the center of the airbag 10.

However, the position of each of the communicating portions 23, 25, and 27, and the venthole 18 is not limited thereto. For example, each of the communicating portions 23, 25, and 27, and the venthole 18 may be alternately disposed on the left side and the right side sandwiching the center of the airbag 10. Alternatively, each of the communicating portions 23, 25, and 27, and the venthole 18 may be alternately disposed on the obliquely upper side and the obliquely lower side sandwiching the center of the airbag 10.

As illustrated in FIG. 5, in this embodiment, both end sides of each of the line-shaped connecting portions 22, 24, and 26 facing each of the communicating portions 23, 25, and 27 are respectively extended toward a center side of the airbag 10. Hereinbelow, both end sides in each of the line-shaped connecting portions 22, 24, and 26, which are thus extended toward the center side of the airbag 10 are called as radial-direction extending portions 22a, 24a, and 26a, and a portion other than the above, which is extended in the peripheral direction, is sometimes called as a peripheral-direction extending portion (reference numeral is omitted).

Each of the radial-direction extending portions 22a, 24a, and 26a continues to both ends of the peripheral-direction extending portions of each of the line-shaped connecting portions 22, 24, or 26, while gently curving.

Incidentally, a mark $L_1$ in FIGS. 1 through 3 indicates a position having a radius equal to that from the center of the airbag 10 to the peripheral-direction extending portion of the line-shaped connecting portion 22. A mark $L_2$ indicates a position having a radius equal to that from the center of the airbag 10 to the peripheral-direction extending portion of the line-shaped connecting portion 24. A mark $L_3$ indicates a position having a radius equal to that from the center of the airbag 10 to the peripheral-direction extending portion of the line-shaped connecting portion 26.

In a retainer 30 for attaching the airbag 10, an inflator-attaching opening (reference numeral is omitted) that is overlapping with the opening 16 for use in an inflator of the rear panel 14 is provided at a center thereof, and bolt insertion holes (reference numeral is omitted) that are overlapping with the bolt insertion holes 20 of the rear panel 14 is provided therearound.

An inflator 36 is formed to have an approximately cylindrical shape, and a gas-blowing outlet 36a is provided at a side peripheral surface on a tip end side in a cylinder axis direction thereof. A flange 38 for fixing the inflator is projected from the side peripheral surface of a halfway portion (rear end side relative to the gas-blowing outlet 36a) in the cylinder axis direction of the inflator 36. In the flange 38, bolt insertion holes (reference numeral is omitted) that are overlapping with the bolt insertion holes of the retainer 30 are provided. A tip end side of the inflator 36 is fitted into the inflator-attaching opening of the retainer 30.

When the airbag 10 is attached to the retainer 30, a peripheral edge portion of the opening 16 for use in an inflator of the rear panel 14 is put on a peripheral edge portion of the inflator-attaching opening of the retainer 30 with pressure by means of a pressing ring 42. The tip end side of the inflator 36 that is fitted into the inflator-attaching opening is inserted into the airbag 10 via the opening 16 for use in an inflator.

At this moment, a stud bolt 44 of the pressing ring 42 is inserted into each of the bolt insertion holes of the rear panel 14, retainer 30, and the flange 38. Furthermore, a nut 46 is fastened on a tip end of the stud bolt 44 and thereby the airbag 10 and the inflator 36 are fixed to the retainer 30.

Thereafter, the airbag 10 is folded back and a modular cover 48 is attached to the retainer 30 in a manner so as to cover a folded-back body of the airbag 10, and thereby the airbag apparatus is constructed. However, preceding the attaching operation for the airbag 10 to the retainer 30, the airbag 10 may be folded back.

This airbag apparatus is installed in a steering wheel (illustration is omitted) of an automobile.

At a time when a vehicle, on which the airbag apparatus is mounted, encounters a collision, or the like, the inflator 36 is activated and the gas is blown out in the airbag 10. The airbag 10 is expanded by means of the gas and pushes open a module cover 48, and is developed in a vehicle interior, and restrains an occupant in the driver's seat.

In this case, as illustrated in FIG. 1, since the connection of the front panel 12 and the rear panel 14 by means of each of the line-shaped connecting portions 22, 24, and 26 is not released until the internal pressure of the airbag 10 is brought to a predetermined pressure or more, the expanding operation of a portion in the airbag 10 on the outer periphery side relative to each of the line-shaped connecting portions 22, 24, and 26 is limited. Therefore, the internal pressure of the airbag 10 rapidly rises by means of the gas from the inflator 36.

A stress by the internal pressure of the airbag 10 is respectively concentrated on the radial-direction extending portions 22a of both end sides of the line-shaped connecting portion 22 on the innermost periphery side, which faces the communicating portion 23. Moreover, when the internal pressure of the airbag 10 is brought to the predetermined pressure or more, the tearing operation of the line-shaped connecting portion 22 is started from these radial-direction extending portions 22a. The tearing operation of the line-shaped connecting portion 22 is respectively transmitted to the left end side and the right end side of the peripheral-direction extending portion of the line-shaped connecting portion 22 from each of the radial-direction extending portions 22a, and proceeds toward the vicinity of the intermediate portion in the extending direction of the peripheral-direction extending portion from the left and right sides, as illustrated in FIGS. 6 and 7.

By means of the tearing operation of the line-shaped connecting portion 22, each of areas in the front panel 12 and the rear panel 14 between the line-shaped connecting portion 22 and the line-shaped connecting portion 24 of the second round is brought to be separatable, and the airbag 10 is largely expanded toward an outer periphery side by one step, as illustrated in FIG. 2.

When an entire line-shaped connecting portion 22 is torn, the stress by the internal pressure of the airbag 10 is respectively concentrated on the radial-direction extending portion 24a on both end sides of the line-shaped connecting portion 24 of the second round facing a communicating portion 25. Further, as illustrated in FIG. 8, the tearing operation of the line-shaped connecting portion 24 is started from these radial-direction extending portions 24a. The tearing operation of the line-shaped connecting portion 24 is also respectively transmitted to the left end side and the right end side of the peripheral-direction extending portion of the line-shaped connecting portion 24 from each of the radial-direction extending portions 24a, and proceeds toward the vicinity of the intermediate portion in the extending direction of the peripheral-direction extending portion from the left and right, as illustrated in FIGS. 8 and 9.

By means of the tearing operation of the line-shaped connecting portion 24, each of areas in the front panel 12 and the rear panel 14 between the line-shaped connecting portion 24 and the line-shaped connecting portion 26 of the third round is brought to be separatable, and the airbag 10 is largely expanded toward the outer periphery side by one step further, as illustrated in FIG. 3.

When an entire line-shaped connecting portion 24 is torn, the stress by the internal pressure of the airbag 10 is respectively concentrated on the radial-direction extending portion 26a on both end sides of the line-shaped connecting portion 26 of the third round facing the communicating portion 27. Further, as illustrated in FIG. 10, the tearing operation of the line-shaped connecting portion 26 is started from these radial-direction extending portions 26a. The tearing operation of the line-shaped connecting portion 26 is also respectively transmitted to the left end side and the right end side of the peripheral-direction extending portion of the line-shaped connecting portion 26 from each of the radial-direction extending portions 26a, and proceeds toward the vicinity of the intermediate portion in the extending direction of the peripheral-direction extending portion from the left and right, as illustrated in FIGS. 10 and 11.

By means of the tearing operation of the line-shaped connecting portion 26 on the outermost peripheral side, each of areas in the front panel 12 and the rear panel 14 from the line-shaped connecting portion 26 to the outermost peripheral portion of the airbag 10 is brought to be separatable, and the airbag 10 is expanded up to the outermost peripheral portion, as illustrated in FIG. 4.

Furthermore, by means of the tearing operation of an entire line-shaped connecting portion 26, the venthole 18 positioned in the vicinity of a finishing point of the tearing operation of the line-shaped connecting portion 26 is opened. Thereby, in a case that the occupant hits the expanded airbag 10, the gas is discharged outside the airbag 10 from the venthole 18, and the occupant is softly restrained by means of the airbag 10.

As described above, the airbag 10 is expanded in a stepwise manner along the tearing operation of each of the line-shaped connecting portions 22, 24, and 26, and thereby the internal pressure of the airbag 10 is maintained to be high pressure from the initial stage of the expanding operation thereof.

In the airbag 10, the communicating portion 25 (the radial-direction extending portion 24a on both end sides of the line-shaped connecting portion 24) serving as a starting point of the tearing operation of the line-shaped connecting portion 24 of the second round is disposed in the vicinity of the finishing point of the tearing operation of the line-shaped connecting portion 22 of the first round, and the communicating portion 27 (the radial-direction extending portion 26a on both end sides of the line-shaped connecting portion 26) serving as a starting point of the tearing operation of the line-shaped connecting portion 26 of the third round is disposed in the vicinity of the finishing point of the tearing operation of the line-shaped connecting portion 24 of the second round.

Therefore, the stress by the internal pressure of the airbag 10 is difficult to concentrate on each of the radial-direction extending portions 24a of the line-shaped connecting portion of the second round until an entire tearing operation of the line-shaped connecting portion 22 of the first round is finished, and the tearing operation of the line-shaped connecting portion 24 of the second round is started after the entire line-shaped connecting portion 22 of the first round is torn. Moreover, the stress by the internal pressure of the airbag 10 is difficult to concentrate on each of the radial-direction extending portions 26a of the line-shaped connecting portion 26 of the third round until an entire tearing operation of the line-shaped connecting portion 24 of the second round is finished, and the tearing operation of the line-shaped connecting portion 26 of the third round is started after the entire line-shaped connecting portion 24 of the second round is torn.

Further, in the airbag 10, since the venthole 18 is disposed in the vicinity of the finishing point of the tearing operation of the line-shaped connecting portion 26 on the outermost periphery side, the venthole 18 is difficult to become an opening state until the tearing operation of the entire line-shaped connecting portion 26 is finished. Accordingly, the gas is prevented from being discharged outside the airbag 10 from the venthole 18 before the tearing operation of each of the line-shaped connecting portions 22, 24, and 26 is finished.

In this embodiment, since both end sides of each of the line-shaped connecting portions 22, 24, and 26 facing each of the communicating portions 23, 25, and 27 are respectively formed into the radial-direction extending portions 22a, 24a, and 26a extending toward the center side of the airbag 10, the stress by the internal pressure of the airbag 10 tends to be concentrated on the radial-direction extending portions 22a, 24a, and 26a, and the tearing operation of each of the line-shaped connecting portions 22, 24, and 26 can be assuredly started from the radial-direction extending portions 22a, 24a, and 26a.

Figure 12:
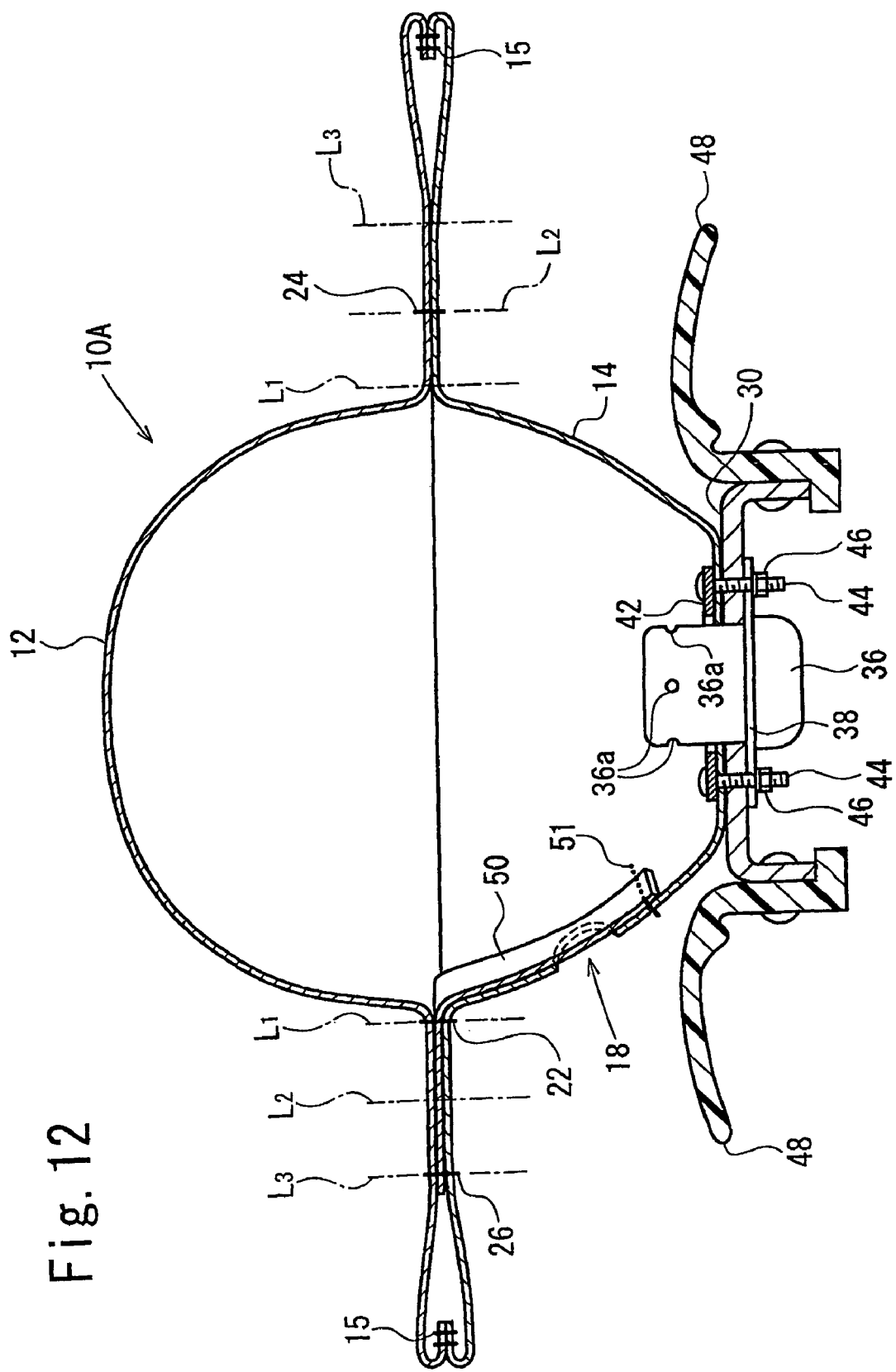
FIG. 12 is a cross-sectional view of an airbag and an airbag apparatus, illustrating the proceeding process of an expanding operation of an airbag according to another embodiment.
Figure 13:
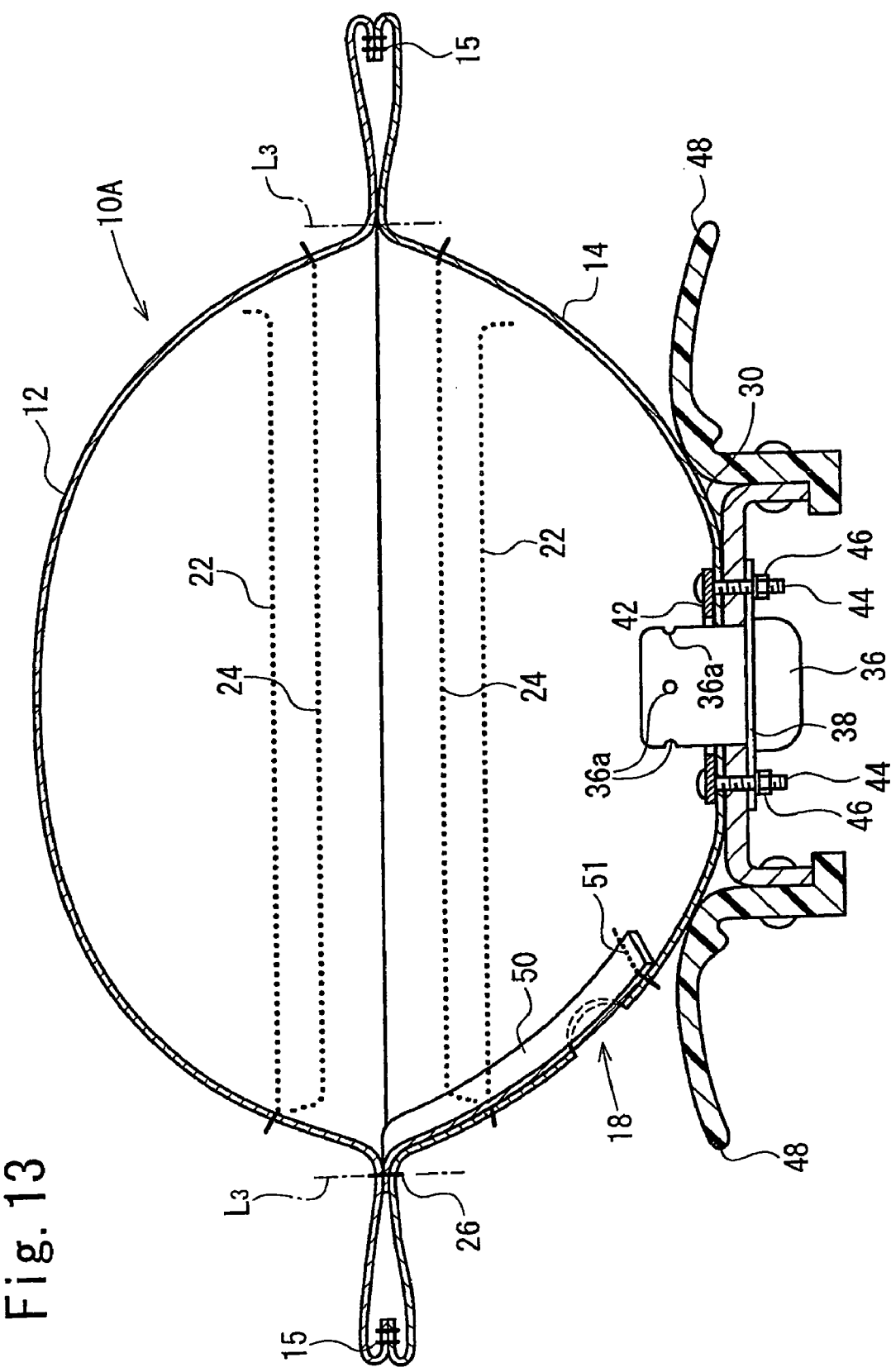
FIG. 13 is a cross-sectional view of the airbag and the airbag apparatus, illustrating the proceeding process of the expanding operation of the airbag of FIG. 12.
Figure 14:
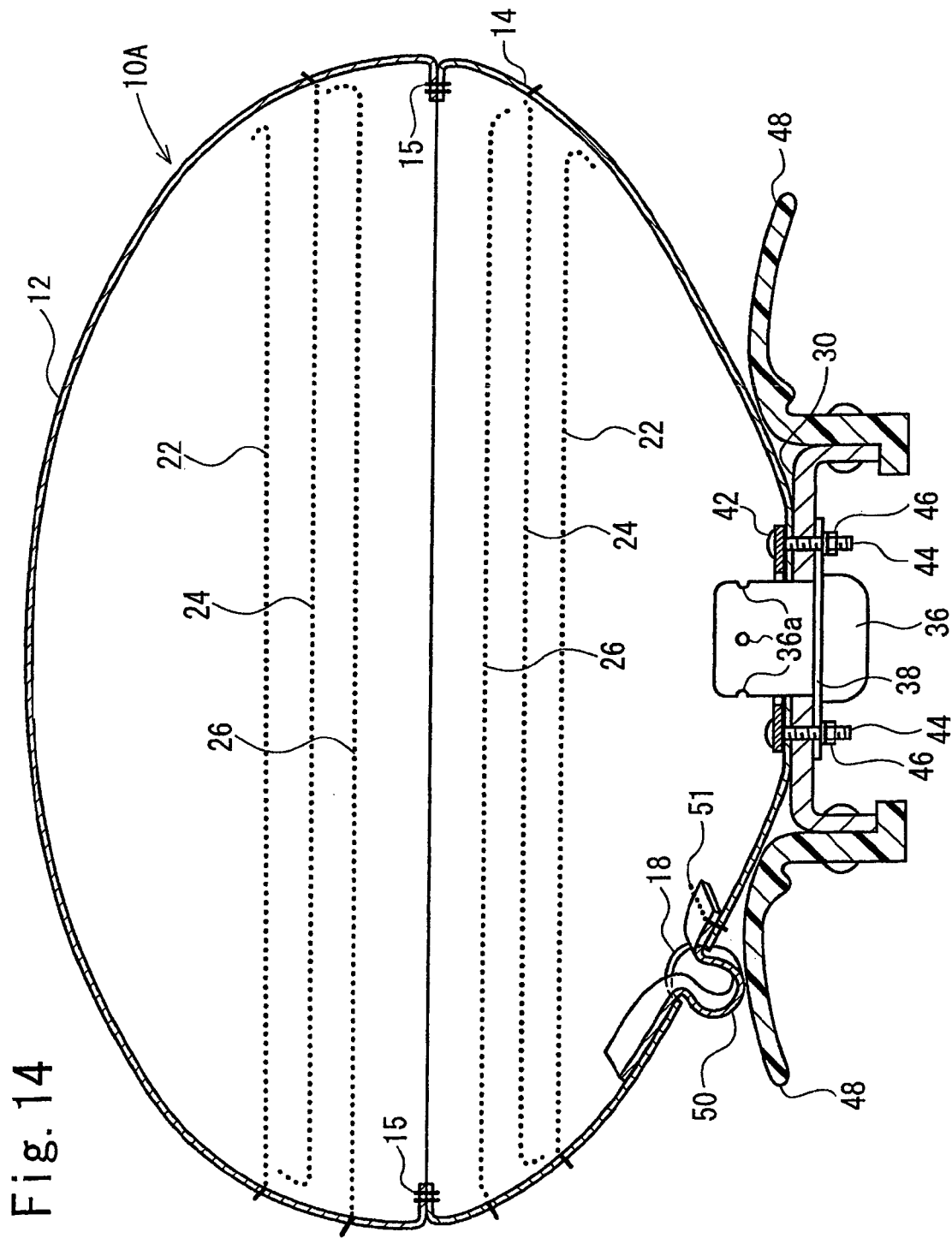
FIG. 14 is a cross-sectional view of the airbag and the airbag apparatus, illustrating the proceeding process of the expanding operation of the airbag of FIG. 12.
Figure 15:
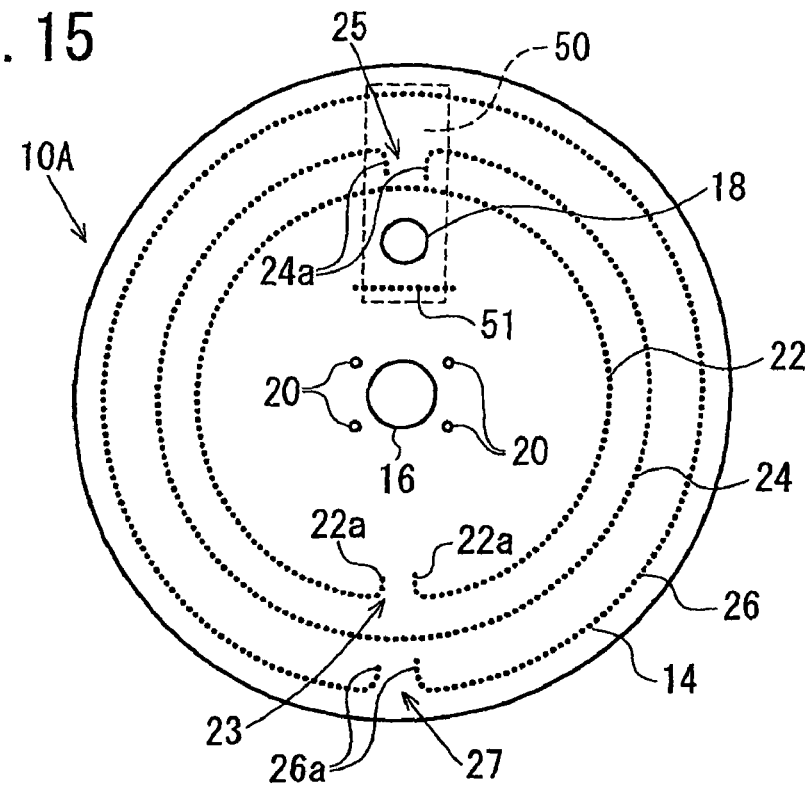
FIG. 15 is a plan view illustrating a state before a tearing operation of the line-shaped connecting portion of the airbag of FIG. 12 is started.
Figure 16:
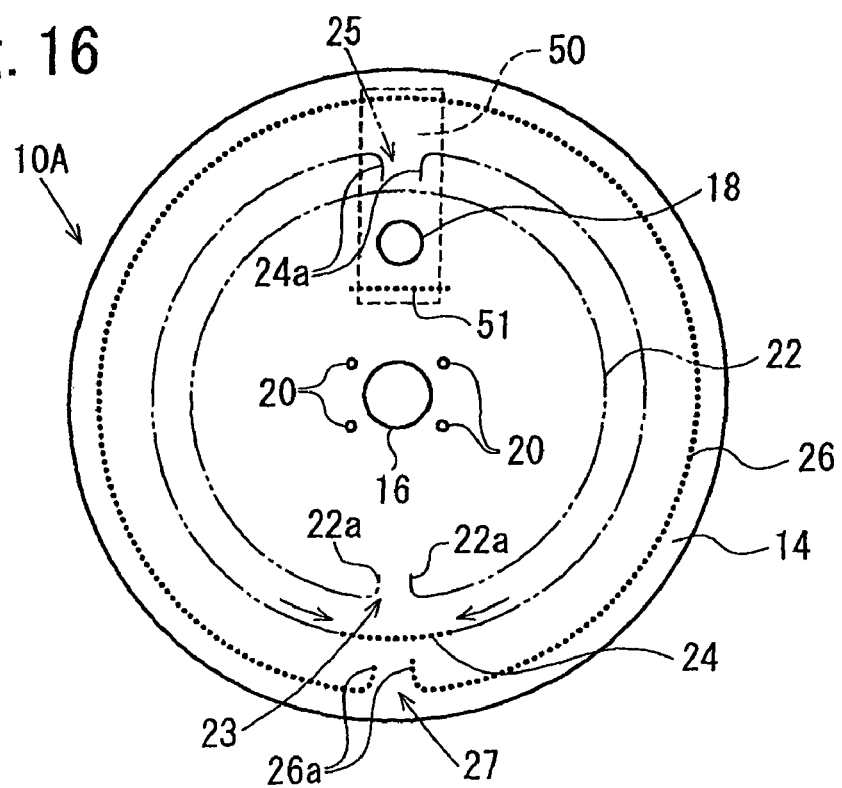
FIG. 16 is a plan view illustrating a proceeding process of the tearing operation of the line-shaped connecting portion of the airbag of FIG. 12.
Figure 17:
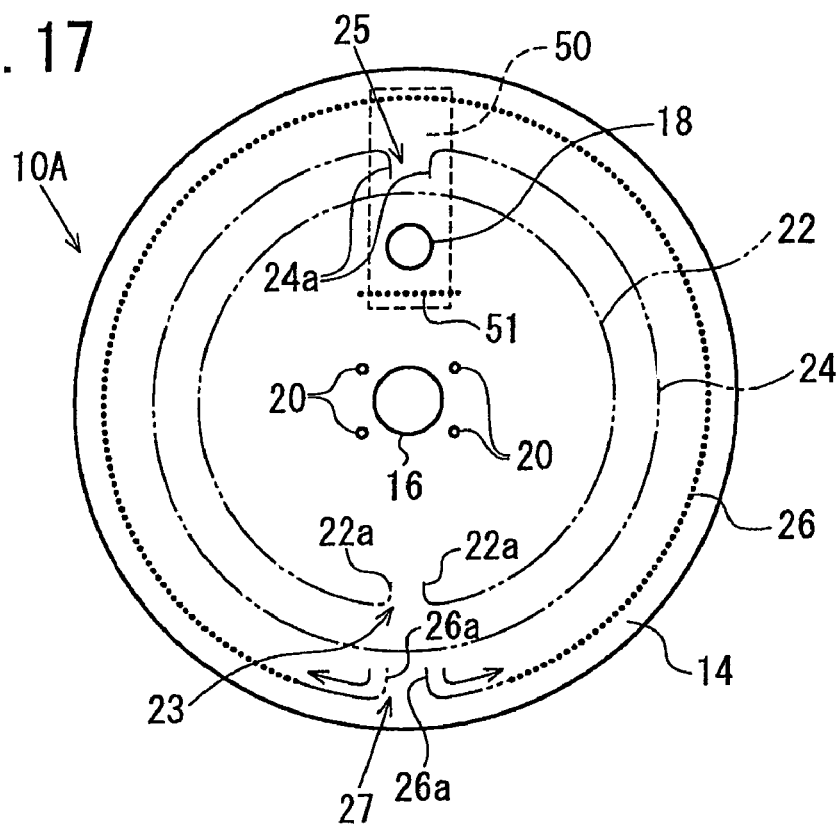
FIG. 17 is a plan view illustrating the proceeding process of the tearing operation of the line-shaped connecting portion of the airbag of FIG. 12.
Figure 18:
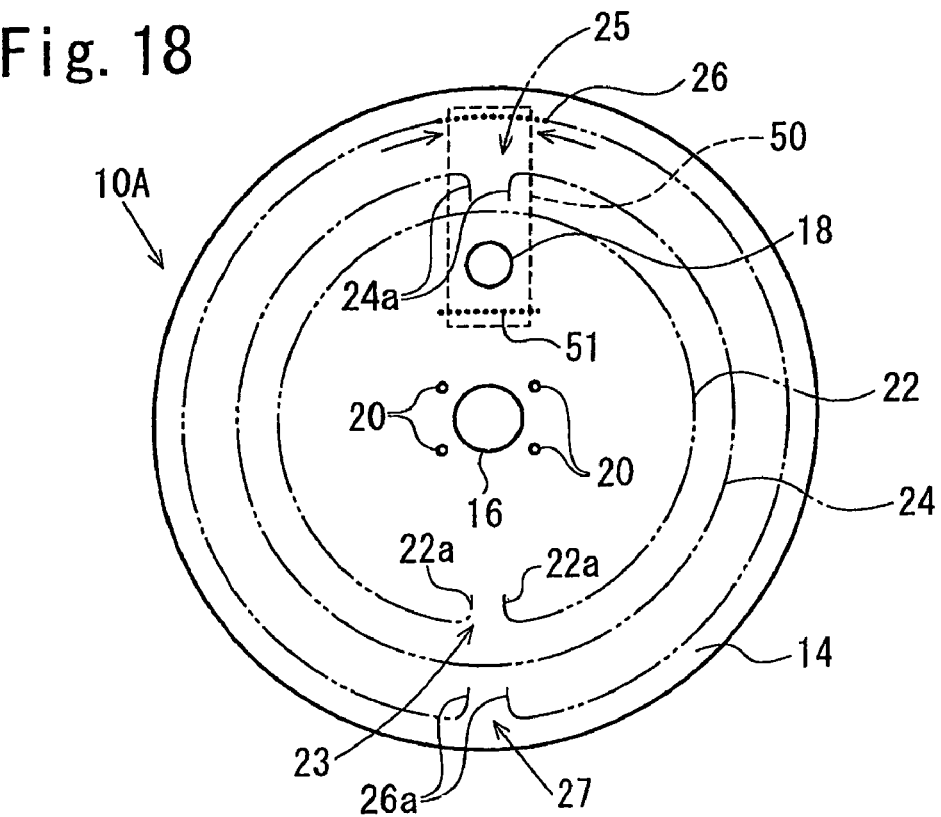
FIG. 18 is a plan view illustrating the proceeding process of the tearing operation of the line-shaped connecting portion of the airbag of FIG. 12.

FIGS. 12 through 14 are cross-sectional views of an airbag and an airbag apparatus illustrating a proceeding process of an expanding operation of the airbag according to another embodiment. FIG. 15 is a plan view illustrating a state before the tearing operation of the line-shaped connecting portion of the airbag is started. FIGS. 16 through 18 are plan views illustrating a proceeding process of the tearing operation of the line-shaped connecting portion. FIGS. 15 through 18 are also views of the airbag looking from a rear panel side.

Incidentally, FIG. 12 illustrates a state before the tearing operation of the line-shaped connecting portion of the first round is started. FIG. 13 illustrates a state before the line-shaped connecting portion of the third round is torn. FIG. 14 illustrates a state after the line-shaped connecting portion of the third round is torn. That is, in this embodiment, the cross-sectional view of the airbag and the airbag apparatus, illustrating a state before the line-shaped connecting portion of the second round is torn is omitted. Furthermore, FIG. 16 illustrates a state just before the tearing operation of the line-shaped connecting portion of the second round is finished. FIG. 17 illustrates a state just after the tearing operation of the line-shaped connecting portion of the third round is started. FIG. 18 illustrates a state just before the tearing operation of the line-shaped connecting portion of the third round is finished. That is, in this embodiment, plan views illustrating proceeding processes of the tearing operation of the line-shaped connecting portions of the first and second rounds, respectively, are omitted.

An airbag 10A of this embodiment has a construction in which the venthole 18 is provided on the center side of the rear panel 14 relative to the line-shaped connecting portion 22 on the innermost periphery side in the airbag 10 of the aforementioned FIGS. 1 through 11, and which a lid member 50 for covering the venthole 18 from an inside of the airbag is provided. In this embodiment, the venthole 18 is also provided just above the center of the airbag 10.

The lid member 50 is formed of a belt-shaped woven cloth in this embodiment, and is disposed to be extended in a radial direction (upper and lower direction) of the airbag along an inside surface of the airbag of the rear panel 14. A halfway portion in the extending direction of the lid member 50 is overlapped with the venthole 18.

One end side in an extending direction of the lid member 50 (end portion on the outer periphery side of the airbag) is extended up to an outer periphery side of the airbag relative to the line-shaped connecting portion 26 on the outermost periphery side, and is sandwiched between the front panel 12 and the rear panel 14, and is integrally connected therewith (in a three-sheet overlapping state) by means of each of the line-shaped connecting portions 22, 24, and 26, as illustrated in FIG. 12. The other end side of the lid member 50 is stitched to the rear panel 14 on the center side of the rear panel 14 relative to the venthole 18 by means of a seam 51 having a higher strength than that of each of the line-shaped connecting portions 22, 24, and 26.

Incidentally, as illustrated in FIG. 15, a connecting position of one end side of the lid member 50 to the front panel 12 and the rear panel 14 by the line-shaped connecting portion 26 is positioned on an opposite side to the communicating portion 27 of the line-shaped connecting portion 26 sandwiching a center of the airbag 10A.

The construction other than that of the airbag 10A is identical of that of the airbag 10 in FIGS. 1 through 11. Moreover, the construction of the airbag apparatus provided with the airbag 10A is also identical of that of the airbag apparatus in FIGS. 1 through 11. In FIGS. 12 through 18, the same reference numerals as that in FIGS. 1 through 11 denote the same elements.

In the thus constructed airbag 10A, the tearing operation of each of the line-shaped connecting portions 22, 24, and 26 in an expanding time of the airbag 10A also proceeds in the same process as that of the aforementioned embodiment.

In this embodiment, one end side of the lid member 50 for covering the venthole 18 is connected to the front panel 12 and the rear panel 14 by means of the line-shaped connecting portion 26 at a position to be opposite side to the communicating portion 27 serving as a starting point of the tearing operation of the line-shaped connecting portion 26 of the outermost periphery side sandwiching the center of the airbag 10A, namely in the vicinity of a finishing point of the tearing operation of the line-shaped connecting portion 26. Accordingly, when the tearing operation of the line-shaped connecting portion 26 of the outermost periphery side is finished, the connection of one end side of the lid member 50 with the front panel 12 and the rear panel 14 by means of the line-shaped connecting portion 26 is released.

Thereby, one end side of the lid member 50 is brought to a free end, and as illustrated in FIG. 14, the lid member is pushed outside the airbag 10A from the venthole 18 by means of the internal pressure of the airbag 10A. As a result, the venthole 18 is brought to an open state, and when the occupant hits the expanded airbag 10A, the gas is discharged outside the airbag 10A from the venthole 18, and the occupant is softly received and restrained by means of the airbag 10A.

In this airbag 10A, as described above, since one end side of the lid member 50 for covering the venthole 18 is connected with the front panel 12 and the rear panel 14 by means of the line-shaped connecting portion 26 in the vicinity of the finishing point of the tearing operation of the line-shaped connecting portion 26 on the outermost periphery side, the lid member 50 remains closing the venthole 18 until the tearing operation of the line-shaped connecting portion 26 on the outermost periphery side is finished. Thereby, the gas can be prevented from being discharged outside the airbag 10A from the venthole 18 before the tearing operation of the line-shaped connecting portion 26 on the outermost periphery side is finished.

Figure 19:
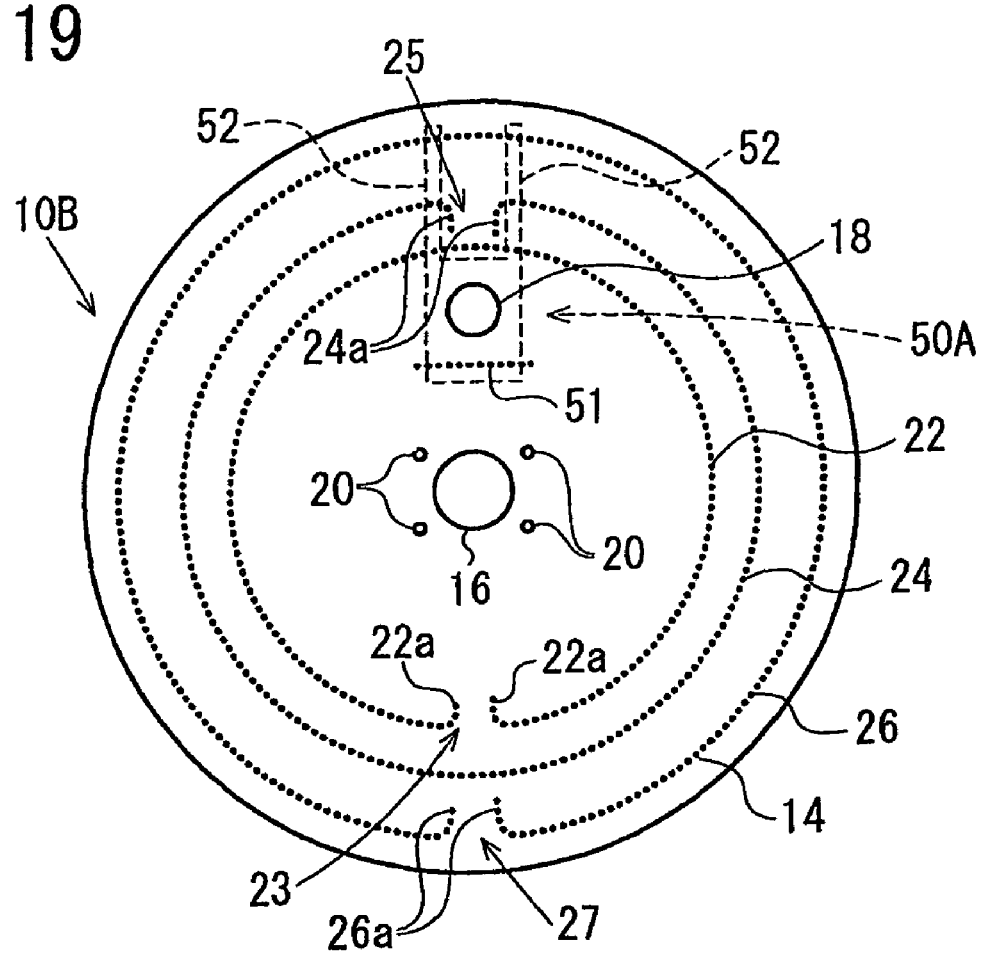
FIG. 19 is a plan view illustrating a state before a line-shaped connecting portion of an airbag according to still another embodiment is torn.
Figure 20:
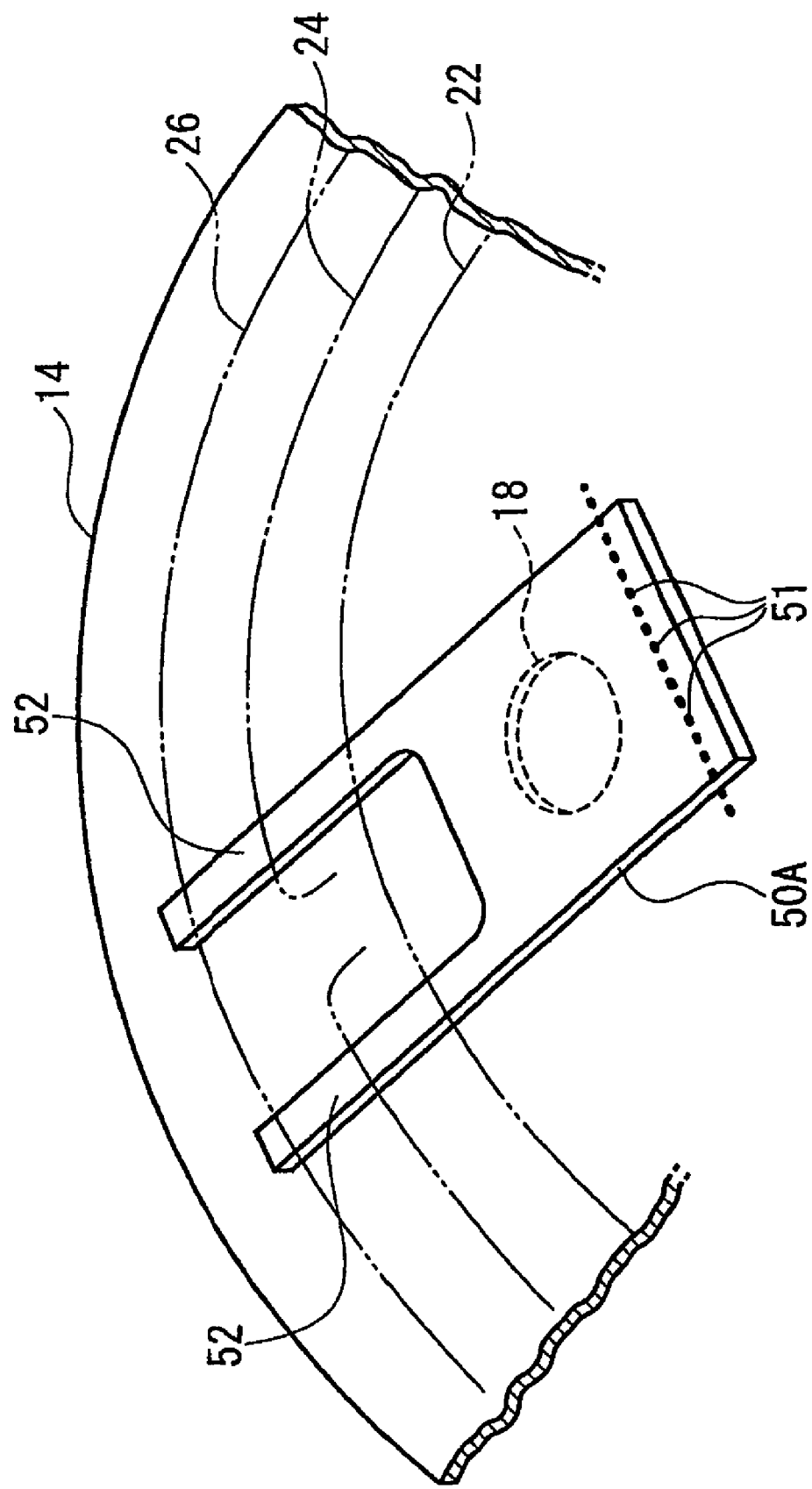
FIG. 20 is a perspective view illustrating the vicinity of a lid-member-installing portion of a rear panel in the airbag of FIG. 19.

FIG. 19 is a plan view illustrating a state before a line-shaped connecting portion of an airbag according to still another embodiment is torn. FIG. 20 is a perspective view illustrating the vicinity of a lid-member-installing portion of a rear panel in the airbag. Incidentally, FIG. 19 is a view of the airbag looking from an outer surface side of the rear panel, and FIG. 20 is a view looking from an inner surface side of the rear panel.

In an airbag 10B of this embodiment, similar to the airbag 10A illustrated in the above-described FIGS. 12 through 18, a lid member 50A for covering the venthole 18 from inside the airbag 10B is also provided. Incidentally, in this embodiment, the venthole 18 is also provided at a position on the center side of the rear panel 14 relative to the line-shaped connecting portion 22 on the innermost periphery side, and on the side just above the center of the airbag 10.

This lid member 50A is also formed of a belt-shaped woven cloth, and is disposed to be extended in a radial direction (upper and lower direction) of the airbag along an inside surface of the airbag of the rear panel 14. A halfway portion in the extending direction of the lid member 50A is overlapped with the venthole 18, and an end portion of the lid member 50A on the center side of the rear panel 14 is stitched to the rear panel 14 on the center side of the rear panel 14 relative to the venthole 18 by means of a seam 51 having a higher strength than that of each of the line-shaped connecting portions 22, 24, and 26.

In this embodiment, a belt-shaped, or a strap-shaped connecting portion 52 is formed at an end portion on the outer periphery side of the rear panel 14 of the lid member 50A. This connecting portion 52 is formed to have a smaller width (preferably, from 10 to 30 mm) relative to a portion covering the venthole 18 in the lid member 50A. As illustrated in FIG. 20, in this embodiment, two connecting portions 52 are extended from left and right corner portions of the end portion of the lid member 50A on the outer periphery side of the rear panel 14 toward the outer periphery side of the rear panel 14. However, the number and arrangement of the connecting portion 52 are not limited thereto.

As illustrated in FIG. 20, in a state that the entire lid member 50A is overlapped along an airbag-inside surface of the rear panel 14, a base end of each of the connecting portions 52 is positioned on the center side of the rear panel 14 relative to the line-shaped connecting portion 22 on the innermost periphery side, and a tip end of each of the connecting portions 52 is extended up to the outer periphery side of the rear panel 14 relative to the line-shaped connecting portion 26 on the outermost periphery side. That is, in this embodiment, each of the connecting portions 52 is sandwiched between the front panel 12 and the rear panel 14, and is integrally connected thereto (in a three-sheet overlapping state) by means of each of the line-shaped connecting portions 22, 24, and 26, and a portion having a wider width than that of each of the connecting portions 52 in the lid member 50A is not connected to the front panel 12 and the rear panel 14.

Incidentally, as illustrated in FIG. 19, similarly to the embodiment in FIGS. 12 through 18, the connecting positions of each of the connecting portions 52 to the front panel 12 and the rear panel 14 by means of the line-shaped connecting portion 26 is positioned on the opposite side to the communicating portion 27 of the line-shaped connecting portion 26 sandwiching a center of the airbag 10B.

Other construction of the airbag 10B is identical of that of the airbag 10A of FIGS. 12 through 18, and the same reference numerals as that of FIGS. 12 through 18 in FIGS. 19 and 20 denote the same element.

In the thus constructed airbag 10B, the tearing operation of each of the line-shaped connecting portions 22, 24, and 26 in an expanding time of the airbag 10B also sequentially proceeds from the innermost periphery side to the outermost periphery side.

In this embodiment, since one end side of the lid member 50A for covering the venthole 18 (each of the connecting portions 52 extended from the lid member 50A) is also connected to the front panel 12 and the rear panel 14 by means of the line-shaped connecting portion 26 in the vicinity of an ending point of the tearing operation of the line-shaped connecting portion 26 on the outermost periphery side, the lid member 50A remains closing the venthole 18 until the tearing operation of the line-shaped connecting portion 26 of the outermost periphery side is finished. Thereby, the gas can be prevented from being discharged outside the airbag 10B from the venthole 18 before the tearing operation of the line-shaped connecting portion 26 on the outermost periphery side is finished.

Further, when the tearing operation of the line-shaped connecting portion 26 on the outermost periphery side is finished, the connection of each of the connecting portions 52, the front panel 12, and the rear panel 14 by means of the line-shaped connecting portion 26 is released, and one end side of the lid member 50A is brought to the free end, and the lid member 50A is pushed outside the airbag 10B from the venthole 18 by means of the internal pressure of the airbag 10B. Thereby, the venthole 18 is brought to an open state, and when the occupant hits the expanded airbag 10B, the gas is discharged outside the airbag 10B from the venthole 18, and the occupant is softly received and restrained by means of the airbag 10B.

In this airbag 10B, the belt-shaped or the strap-shaped connecting portions 52 having a thin width is provided on one end side of the lid member 50A, and the connecting members 52 are connected to the front panel 12 and the rear panel 14 by means of each of the line-shaped connecting portions 22, 24, and 26. Thereby, compared to a case that the lid member 50A is connected to the front panel 12 and the rear panel 14 by means of each of the line-shaped connecting portions 22, 24, and 26 across the entire width, a connection-releasing operation for the lid member 50A, the front panel 12, and the rear panel 14 along the tearing operation of each of the line-shaped connecting portions 22, 24, and 26 is smoothly performed.

The aforementioned each of the embodiments is an example of the present invention, and the present invention is not limited to the aforementioned each of the embodiments.

For example, although the airbag and the airbag apparatus are the airbag and the airbag apparatus for use in the driver's seat of the automobile in the aforementioned embodiment, the present invention is applicable to an airbag and an airbag apparatus for various uses other than the above-described.

Incidentally, the present application is based on Japanese Patent Application (Japanese Patent Application No. 2006-164981) filed Jun. 14, 2006, the entire contents of which are incorporated by reference.

The invention claimed is:

1. An airbag including a front panel disposed on an occupant side, and a rear panel disposed on a side opposite to the occupant side, in which in the front panel and the rear panel, peripheral edge portions thereof are connected to each other, and an opening for use in a gas-generator is provided at a center of the rear panel, and a halfway portion disposed halfway between a respective center portion and a peripheral edge portion of the front and rear panels, said halfway portion being disconnectably connected by means of circular line-shaped connecting portions extending in a peripheral direction, and the line-shaped connecting portions being provided in a plurality and arranged approximately concentrically, and the line shaped connecting portions having a communicating portion allowing an inner periphery side and an outer periphery side of the line shaped connecting portions to communicate with each other, the communication portions partially interrupting a connection of the front panel and the rear panel, said communicating portions provided in an extending direction of each of the line-shaped connecting portions at the halfway portion, wherein the individual communicating portions are positioned on sides opposite to each other while a center of the airbag is sandwiched between the individual line-shaped connecting portions, wherein the line-shaped connecting portions are provided next to each other in a radial direction.

2. The airbag according to claim 1, wherein both end sides of the line-shaped connecting portions facing the communicating portion extend toward a center side of the airbag.

3. The airbag according to claim 1, wherein a venthole is provided in an area that forms an outer periphery side relative to the line-shaped connecting portion of an outermost periphery side in the rear panel, and the communicating portion of the line-shaped connecting portion of the outermost periphery side and the venthole are positioned on sides opposite to each other while sandwiching the center of the airbag.

4. The airbag according to claim 1, wherein the venthole is provided in the rear panel, and a lid member for covering the venthole is provided inside the airbag, and wherein one end side of the lid member is connected to the front panel and the rear panel by means of the line-shaped connecting portion on at least an outermost periphery side, and the other end side is connected to the rear panel by means of a connecting device that is different from the line-shaped connecting portion, and wherein the communicating portion of the line-shaped connecting portion on the outermost periphery side is positioned on a side opposite to the one end side of the lid member while sandwiching the center of the airbag.

5. The airbag according to claim 4, wherein a connecting portion having a smaller width than that of the lid member extends from the one end portion of the lid member, and the connecting portion is connected to the front panel and the rear panel by means of the line-shaped connecting portion on at least the outermost periphery side.

6. An airbag apparatus including an airbag and a gas-generator for expanding the airbag, wherein the airbag is the airbag according to claim 1.

7. The airbag according to claim 1, wherein the line-shaped connecting portion on an innermost periphery side is disposed within an area from 400 to 600 mm in radius from the center of the airbag.

8. The airbag according to claim 1, wherein a distance between the individual line-shaped connecting portions provided next to each other in the radial direction of the airbag is set to be from 10 to 50 mm.

* * * * *